No. 886,479. PATENTED MAY 5, 1908.
C. H. CLINE.
LOAD BINDER FOR HAY RACKS.
APPLICATION FILED JUNE 21, 1907.

UNITED STATES PATENT OFFICE.

CHARLES H. CLINE, OF HUNTINGTON, INDIANA.

LOAD-BINDER FOR HAY-RACKS.

No. 886,479.  Specification of Letters Patent.  Patented May 5, 1908.

Application filed June 21, 1907. Serial No. 380,182.

*To all whom it may concern:*

Be it known that I, CHARLES H. CLINE, a citizen of the United States, residing at Huntington, in the county of Huntington and State of Indiana, have invented certain new and useful Improvements in Load-Binders for Hay-Racks, of which the following is a specification.

The present invention is in the nature of an improved load binder for hay racks and the like, and has for its object to design an extremely simple and inexpensive binder which is durable in its construction, and is more efficient in operation than the boom pole in common use.

A further object of the invention is to provide a binder of this type which can be readily applied to any of the conventional forms of hay racks and by means of which a single man can securely bind a load of straw, hay, or corn without external assistance.

Figure 1:
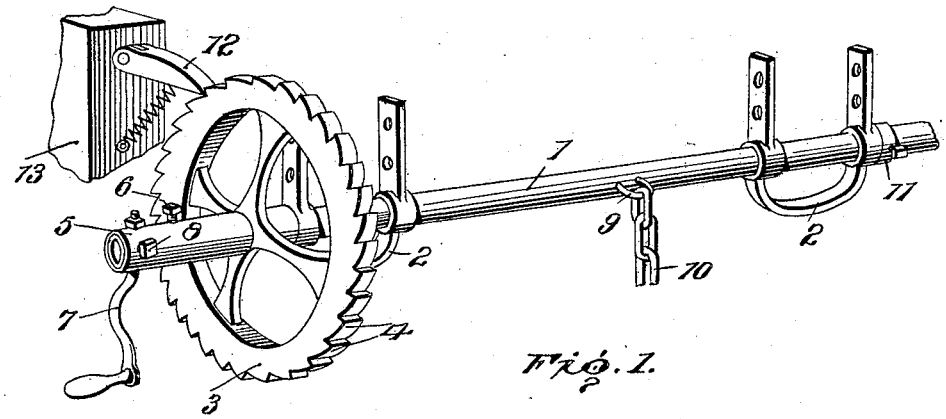
Figure 2:
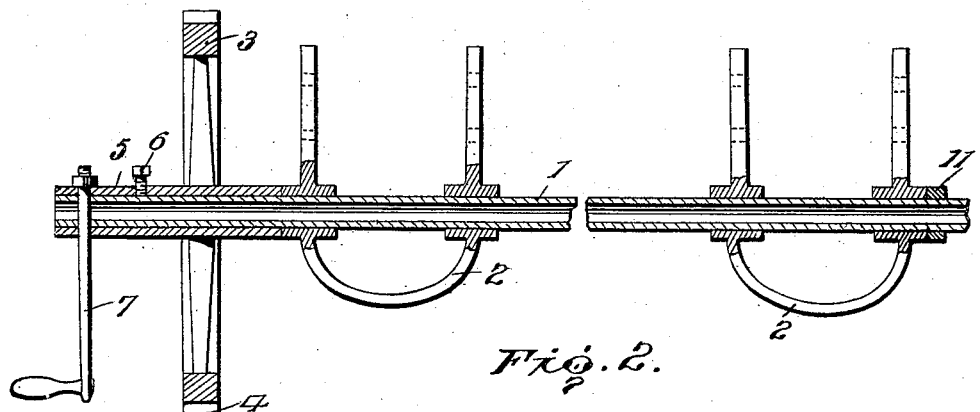
Figure 3:
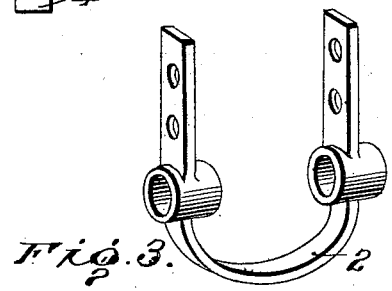

For a full description of the invention and the merits thereof and also to acquire a knowledge of the details of construction and the means for effecting the result, reference is to be had to the following description and accompanying drawings, in which:

Figure 1 is a perspective view of an improved load binder. Fig. 2 is a longitudinal sectional view through the same. Fig. 3 is a detail view of one of the bearings.

Corresponding and like parts are referred to in the following description and indicated in all the views of the drawings by the same reference characters.

Specifically describing the invention the numeral 1 designates the shaft which preferably has a tubular formation and is journaled within the bearings 2. A ratchet wheel 3 is applied to one end of the shaft 1, the periphery of the wheel carrying the usual teeth 4 while the hub 5 is extended and is clamped upon the shaft 1 by means of a set screw 6. The outer end of the hub 5 and the shaft 1 are formed with corresponding lateral openings designed to register and receive the shank of the crank handle 7, the said wheel and shaft being thereby rigidly locked together. Any suitable means such as the set screw 8 may be utilized for retaining the handle 7 in position. At an intermediate point the shank 1 has a pair of transverse openings formed therein for the reception of the two limbs of a U bolt 9, the said U bolt serving as a means for clamping the end of the binding cable 10 to the shaft 1 whereby the rope is wound upon the shaft as the latter is rotated. The bearings 2 are in the nature of U shape brackets the two arms of which are attached to the sills of the hay rack in any suitable manner. Each of the arms is formed at a point adjacent the cross bar with an opening, the various openings being in alinement with each other and receiving the shaft 1 which is journaled therein. One of these bearings 2 is located at each end of the binder, the inner end of the hub of the wheel 3 bearing against one of the bearings while a collar 11 is clamped upon the shaft 1 by means of a set screw so as to engage the opposite bearing and prevent longitudinal movement of the shaft. In order to prevent back turning of the wheel 3 a spring actuated pawl 12 is mounted to engage the teeth 4, the said pawl being pivoted to a plate 13 designed to be attached to one of the sills of the rack. It will thus be apparent that by grasping the crank handle 7 and rotating the shaft 1 the binding cable 10 will be wound thereon and the load thereby securely bound in position.

Having thus described the invention, what is claimed as new is:

1. A load binder comprising a shaft, U shape brackets for the shaft, the arms of the U shape brackets being formed with registering openings serving as bearings for the shaft, and means for operating the shaft.

2. A load binder comprising a shaft, bearings for the shaft, a ratchet wheel applied to the shaft, the hub of the ratchet wheel and the shaft being formed with corresponding openings, and a handle designed to be inserted through the corresponding openings of the hub and shaft whereby the two members are rigidly locked together.

3. A load binder comprising a shaft, U shape brackets for the shaft, the arms of the U shape brackets being formed with registering openings serving as bearings for the shaft, a ratchet wheel applied to the shaft, and a handle for operating the shaft.

4. A load binder for hay racks comprising a shaft, U shape brackets the arms of which are secured to the sills of the hay rack and formed with registering openings forming bearings for the shaft, a ratchet wheel applied to the shaft, a handle for operating the shaft, a plate secured to one of the sills of the rack, and a pawl carried by the plate and engaging the teeth upon the ratchet wheel.

5. A load binder for hay racks comprising a shaft, U shape brackets for the shaft, the arms of the brackets being secured to the sills of the hay rack and provided with registering openings serving as a bearing for the shaft, a ratchet wheel applied to the shaft, the hub of the ratchet wheel and the shaft being formed with corresponding openings, a crank handle extending through the openings and locking the ratchet wheel rigidly together, a plate designed to be attached to one of the sills of the hay rack, and a pawl carried by the plate and engaging the teeth of the ratchet wheel.

In testimony whereof I affix my signature in presence of two witnesses.

CHARLES H. CLINE. [L. S.]

Witnesses:
JOHN Q. CLINE,
CLAUDE CLINE.